(12) United States Patent
Fraser et al.

(10) Patent No.: US 10,839,286 B2
(45) Date of Patent: Nov. 17, 2020

(54) SYSTEM AND METHOD FOR IMPLEMENTING NEURAL NETWORKS IN INTEGRATED CIRCUITS

(71) Applicant: Xilinx, Inc., San Jose, CA (US)

(72) Inventors: Nicholas Fraser, Dublin (IE); Michaela Blott, Malahide (IE)

(73) Assignee: XILINX, INC., San Jose, CA (US)

( * ) Notice: Subject to any disclaimer, the term of this patent is extended or adjusted under 35 U.S.C. 154(b) by 689 days.

(21) Appl. No.: 15/705,033

(22) Filed: Sep. 14, 2017

(65) Prior Publication Data

US 2019/0080223 A1    Mar. 14, 2019

(51) Int. Cl.
*G06N 3/04* (2006.01)
*G06N 3/08* (2006.01)
*G06N 3/063* (2006.01)

(52) U.S. Cl.
CPC .............. *G06N 3/04* (2013.01); *G06N 3/08* (2013.01); *G06N 3/084* (2013.01); *G06N 3/063* (2013.01)

(58) Field of Classification Search
USPC .......................................................... 706/25
See application file for complete search history.

(56) References Cited

U.S. PATENT DOCUMENTS

| | | | |
|---|---|---|---|
| 5,892,962 A | 4/1999 | Cloutier | |
| 7,822,066 B1 * | 10/2010 | Blott | H04L 69/22 370/474 |
| 8,103,606 B2 | 1/2012 | Moussa et al. | |
| 9,092,305 B1 * | 7/2015 | Blott | G06F 13/1642 |
| 9,323,457 B2 * | 4/2016 | Blott | G06F 16/24569 |
| 9,503,093 B2 * | 11/2016 | Karras | H03K 19/17724 |
| 9,519,486 B1 * | 12/2016 | Blott | G06F 15/7878 |
| 9,711,194 B2 * | 7/2017 | Blott | G06F 12/0813 |

(Continued)

FOREIGN PATENT DOCUMENTS

| | | |
|---|---|---|
| CN | 106228240 | 12/2016 |
| CN | 107153873 | 9/2017 |
| WO | 2017201506 | 11/2017 |

OTHER PUBLICATIONS

Czarnecki, Wojciech et al., "Understanding Synthetic Gradients and Decoupled Neural Interfaces," arXiv:1703.00522v1, Mar. 1, 2017, pp. 1-16, Cornell University Library, http://arvix.org.

(Continued)

*Primary Examiner* — Michael B Holmes
(74) *Attorney, Agent, or Firm* — Patterson + Sheridan, LLP

(57) ABSTRACT

A neural network system includes an input layer, one or more hidden layers, and an output layer. The input layer receives a training set including a sequence of batches and provides to its following layer output activations associated with the sequence of batches respectively. A first hidden layer receives, from its preceding layer, a first input activation associated with a first batch, receive a first input gradient associated with a second batch preceding the first batch, and provide, to its following layer a first output activation associated with the first batch based on the first input activation and first input gradient. The first and second batches have a delay factor associated with at least two batches. The output layer receives, from its preceding layer, a second input activation, and provide, to its preceding layer, a first output gradient based on the second input activation and the first training set.

20 Claims, 14 Drawing Sheets

(56) References Cited

U.S. PATENT DOCUMENTS

| | | | | |
|---|---|---|---|---|
| 10,089,577 | B2* | 10/2018 | Umuroglu | G06N 3/063 |
| 10,320,918 | B1* | 6/2019 | Blott | H04L 69/161 |
| 10,482,054 | B1* | 11/2019 | Liu | G06F 13/42 |
| 10,482,129 | B1* | 11/2019 | Blott | G06F 16/9014 |
| 10,523,596 | B1* | 12/2019 | Ferger | H04L 49/30 |
| 2005/0049984 | A1 | 3/2005 | King | |

OTHER PUBLICATIONS

Goyal, Priya et al., "Accurate, Large Minibatch SGD: Training ImageNet in 1 Hour," arXiv:1706.02677, Jun. 8, 2017, pp. 1-12, Cornell University Library, http://arvix.org.

Umuroglu, Yaman et al., "FINN: A Framework for Fast, Scalable Binarized Neural Network Interface," arXiv:1612.07119, Dec. 1, 2016, pp. 1-10, Cornell University Library, http://arvix.org.

Altera, "Efficient Implementation of Neural Network Systems Built on FPGAs, Programmed with OpenCL," Copyright 2015, pp. 1-2. Altera Corp., now Intel Corp, Santa Clara, California, USA.

Arnold, Mark G. et al., "Redundant Logarithmic Arithmetic," IEEE Transactions on Computers, Aug. 1990, pp. 1077-1086, vol. 39, No. 8, IEEE, Piscataway, New Jersey, USA.

Auviz Systems, "AuvizDNN," dowloaded Jul. 6, 2017, pp. 1-2, Auviz Systems, now Xilinx, Inc., San Jose, California, USA.

Beiu, Valerie, "Digital Integrated Circuit Implementation," Handbook of Neural Computation, Release 97/1, Jan. 1997, Section E1.4, pp. E1.4:1 to E1.4:34, Oxford University Press, New York, New York, USA.

Courbariaux, Matthieu et al., "Binarized Neural Networks: Training Neural Networks with Weights and Activations Constrained to +1 or −1," Feb. 9, 2016, pp. 1-11, Cornell University Library, Ithaca, New York, USA.

Dally, William, "High-Performance Hardware for Machine Learning," Feb. 9, 2016, Cadence ENN Summit, Cadence Design Systems, San Jose, California, USA.

Douglas, Scott C. et al., "A Pipelined LMS Adaptive FIR Filter Architecture Without Adaptation Delay," IEEE Transactions on Signal Processing, Mar. 1998, pp. 775-779, IEEE, Piscataway, New Jersey, USA.

Eldredge, James G. et al., "RRAN: A Hardware Implementation of the Backpropagation Algorithm Using Reconfigurable FPGAs," IEEE International Conference on Neural Networks, Jun. 26, 1994, pp. 1-6, IEEE, Piscataway, New Jersey, USA.

Gadea, Rafael et al., "Artificial Neural Network Implementation on a Single FPGA of a Pipelined On-Line Backpropagation," Jan. 2000, pp. 1-7, http://www.researchgate.net, ResearchGate GmbH, Berlin, Germany.

Gadea, Rafael et al., "Forward-Backward Parallelism in On-Line Backpropagation," Jan. 1999, pp. 1-11, http:/www.researchgate.net, ResearchGate GmbH, Berlin, Germany.

Gadea, Rafael et al., "Systolic Implementation of a Pipelined On-Line Backpropagation," Feb. 1999, pp. 1-9, http:/www.researchgate.net, ResearchGate GmbH, Berlin, Germany.

Gupta, Suyog et al., "Deep Learning with Limited Numerical Precision," Proc. of the 32nd International Conference on Machine Learning, Jul. 6, 2015, pp. 1-10, ACM DL Digital Library, http://dl.acm.org.

Hubara, Itay et al., "Quantized Neural Networks: Training Neural Networks with Low Precision Weights and Activations," Sep. 22, 2016, pp. 1-29, Cornell University Library, Ithaca, New York, USA.

Iandola, Forrest N. et al., "SqueezeNet: AlexNet-level Accuracy with 50x Fewer Parameters and <0.5MB Model Size," Apr. 6, 2016, pp. 1-9, Cornell University Library, Ithaca, New York, USA.

Jaderberg, Max et al., "Decoupled Neural Interfaces Using Symthetic Gradients," Jul. 3, 2017, pp. 1-20, Cornell University Library, Ithaca, New York, USA.

Kim, Minje et al., "Bitwise Neural Networks," Jan. 22, 2016, pp. 1-5, Cornell University Library, Ithaca, New York, USA.

Klingma, Diederik et al., "ADAM: A Method for Stochastic Optimization," Jul. 23, 2015, pp. 1-15, Proc. of the 3rd International Conference on Learning Representations, May 7, 2015, http://www.iclr.cc/.

Long, Guozhu et al., "The LMS Algorithm with Delayed Coefficient Adaptation," IEEE Transactions on Acoustics, Speech, and Signal Processing, Sep. 1989, pp. 1397-1405, vol. 37, No. 9, IEEE, Piscataway, New Jersey, USA.

Miyashita, Daisuke et al., "Convolutional Neural Networks usig Logarithmic Data Representation," Mar. 17, 2016, pp. 1-10, Cornell University Library, Ithaca, New York, USA.

NVIDIA, GPU-Based Deep Learning Inference: A Performance and Power Analysis, Nov. 2015, pp. 1-12, NVIDIA, Santa Clara, California, USA.

Ovtcharov, Kalin et al., "Accelerating Deep Convolutional Neural Networks Using Specialized Hardware," Feb. 22, 2015, pp. 1-4, Microsoft Corporation, Redmond, Washington ,USA.

Petrowski, Alain et al., "Performance Analysis of a Pipelined Backpropagation Parallel Algorithm," Dec. 17, 1993, pp. 1-29.

Pinjare, S. L., "Implementation of Neural Network Back Propagation Training Algorithm on FPGA," International Journal of Computer Applications, Aug. 2012, pp. 1-7, vol. 52, No. 6, http://www.ijcaonline.org/.

Poltmann, Rainer D., "Conversion of the Delayed LMS Algorithm into the LMS Algorithm," IEEE Signal Processing Letters, Dec. 1995, pp. 223-224, IEEE, Piscataway, New Jersey, USA.

Rastegari, Mohammad et al., "XNOR-Net: ImageNet Classification Using Binary Convolutional Neural Networks," Apr. 19, 2016, pp. 1-17, Cornell University Library, Ithaca, New York, USA.

Sung, Wonyoung et al., "Resiliency of Deep Neural Networks Under Quantization," Jan. 7, 2016, Proc. of the 4th International Conference on Learning Representations, http://www.iclr.cc/.

Widrow, Bernard et al., "Adaptive Switching Circuits," IRE WESCON Convention Record, Aug. 1960, pp. 96-104, vol. 4, Stanford University, Information Systems Laboratory, Electrical Engineering Dept., Stanford, California, USA.

Yi, Y. et al., "High Speed FPGA-Based Implementation of Delayed-LMS Filters," Journal of VLSI Signal Processing, Jan. 1, 2005, pp. 113-131, vol. 39, Issue 1-2, Springer Science & Business Media, Inc., Netherlands.

Zhou, Shuchang et al., "DoReFa-Net: Training Low Bitwidth Convolutional Neural Networks with Low Bitwidth Gradients," Jun. 20, 2016, http:/www.researchgate.net, ResearchGate GmbH, Berlin, Germany.

Gick, S. et al., "Automatic Synthesis of Neural Networks to Programmable Hardware," Proc. of the Third International Conference on Microelectronics for Neural Networks, Apr. 6, 1993, The University of Edinburgh, Edinburgh, Scotland, U.K.

Girau, Bernard, "FPNA, FPNN: from programmable fields to topologically simplified neural networks," [intern report], 1999, pp. 1-14, https://hal.inria.fr/inria-00107829.

Teradeep, "Teradeep" website, n.d. Web. Jul. 26, 2017, TeraDeep, Campbell, California, USA.

Multicoreware, "Deep Learning Neural Networks," http://multicorewareinc.com/deep-learning, n.d. Web Jul. 26, 2017, MulticoreWare, Saratoga, California, USA.

Specification and drawings for U.S. Appl. No. 15/230,164, filed Aug. 5, 2016, Umuroglu et al.

Tsihrintzis, George A. et al., "Exact Maximum Likelihood Identification of MA(1) Systems Driven by Cauchy Noise of Unknown Dispersion," IEEE Signal Processing Letters, Dec. 1995, pp. 224-226, vol. 2, No. 12, IEEE, Piscataway, New Jersey, USA.

Girau, Bernard, "Neural Networks on FPGAs: A Survey," Proc. of the 2nd Symposium on Neural Computation, Jan. 2000, pp. 1-7.

* cited by examiner

800

At layer i, receive activations $Act_{i-1}(b)$ from layer i-1 and gradients $Grad_{i+1}(b-d)$ from layer i+1
802

↓

Generate weights $W_i(b-d)$ based on $Act_{i-1}(b-d)$ and $Grad_{i+1}(b-d)$
804

↓

Output activations $Act_i(b)$ and gradients $Grad_i(b-d)$ generated using the weights $W_i(b-d)$
806

FIG. 8

SYSTEM AND METHOD FOR IMPLEMENTING NEURAL NETWORKS IN INTEGRATED CIRCUITS

TECHNICAL FIELD

Examples of the present disclosure generally relate to integrated circuits ("ICs") and, in particular, to neural networks in ICs.

BACKGROUND

Machine learning capabilities are fast evolving. For example, neural networks (NNs) may be used in both data centers and embedded applications. Typically, neural networks need to be trained on a sufficiently large dataset, and the training is performed on the basis of floating point arithmetic using general purpose graphics processing units (GPGPUs). Such training, depending on the size of a network and the size of the training datasets, may take a very long time. In general, a training dataset consists of input/output pairs. The goal of neural network training is to create a model which maps each input of the training set to the corresponding output. In real use cases, this model may also generalize to data which is not part of the training set.

Accordingly, it would be desirable and useful to provide an improved way of implementing neural network trainings.

SUMMARY

In some embodiments in accordance with the present disclosure, a neural network system includes an input layer, one or more hidden layers following the input layer, and an output layer following the one or more hidden layers. The input layer is configured to: receive a first training set including a sequence of batches; and provide, to a following layer of the input layer, a plurality of output activations associated with the sequence of batches respectively. The one or more hidden layers include a first hidden layer configured to: receive, from a preceding layer of the first hidden layer, a first input activation associated with a first batch; receive a first input gradient associated with a second batch preceding the first batch, wherein the first and second batches have a delay factor associated with at least two batches; and provide, to a following layer of the first hidden layer, a first output activation associated with the first batch based on the first input activation and first input gradient. The output layer is configured to: receive, from a preceding layer of the output layer, a second input activation; and provide, to the preceding layer of the output layer, a first output gradient based on the second input activation and the first training set.

In some embodiments, the first hidden layer is configured to provide, to the preceding layer of the first hidden layer, a second output gradient associated with the second batch based on the first input activation and the first input gradient.

In some embodiments, the first hidden layer is configured to: generate a first weight associated with the second batch based on a third input activation associated with the second batch and first input gradient; and generate the first output activation associated with the first batch based on the first input activation, first input gradient, and first weight.

In some embodiments, the first hidden layer is configured to: generate the second output gradient based on the first input activation, first input gradient, and first weight.

In some embodiments, the first hidden layer is configured to: adjust a learning rate based on the delay factor between the first batch and second batch; and generate the first weight associated with the second batch by applying the learning rate to the first input gradient associated with the second batch.

In some embodiments, the neural network system includes a preprocessing unit configured to: receive an original training set having a first size; and generate the first training set based on the original training set, wherein the first training set has a second size greater than the first size.

In some embodiments, the first hidden layer is configured to: receive, from the following layer of the first hidden layer, the first input gradient.

In some embodiments, the first hidden layer is coupled to a synthetic gradient generator that is configured to: generate a first input gradient estimate using a second input gradient associated with a third batch preceding the second batch; and provide to the first hidden layer the first input gradient estimate as the first input gradient.

In some embodiments, the synthetic gradient generator is configured to: receive a second input gradient from the following layer of the first hidden layer; generate a gradient estimate error based on the first input gradient estimate and the second input gradient; and generate a second input gradient estimate based on the gradient estimate error using a machine learning algorithm.

In some embodiments, the first input activation, the first output activation, the second input activation, and the first output gradient include binary values.

In some embodiments, the neural network system includes a logarithmic data representation configured to quantize the first input activation, the first output activation, the second input activation, and the first output gradient in a log-domain.

In some embodiments, the neural network system includes first and second integrated circuits (ICs). The first IC is configured to implement a first layer of a plurality of layers including the input layer, the one or more hidden layers, and the output layer. The first IC has a first computational capacity according to a first computational capacity requirement of the first layer; and a second IC configured to implement a second layer of the plurality of layers, wherein the second IC has a second computational capacity according to a second computational capacity requirement of the second layer.

In some embodiments, the neural network system includes a plurality of accelerators. Each accelerator is configured to implement one layer of the input layer, the one or more hidden layers, and the output layer. Each accelerator is configured to have a computational capacity and a memory capacity based on the respective layer.

In some embodiments, a method includes receiving, by an input layer, a first training set including a sequence of batches; providing, by the input layer to a following layer of the input layer, a plurality of output activations associated with the sequence of batches respectively; receiving, by a first hidden layer from a preceding layer of the first hidden layer, a first input activation associated with a first batch; receiving, by the first hidden layer, a first input gradient associated with a second batch preceding the first batch, wherein the first and second batches have a delay factor associated with at least two batches; providing, by the first hidden layer to a following layer of the first hidden layer, a first output activation associated with the first batch based on the first input activation and first input gradient; receiving, by an output layer following the first hidden layer from a preceding layer of the output layer, a second input activation; and providing, by the output layer to the preceding layer of the output layer, a first output gradient based on the second input activation and the first training set.

In some embodiments, the method includes providing, by the first hidden layer to the preceding layer, a second output gradient associated with the second batch based on the first input activation and the first input gradient.

In some embodiments, the method includes generating, by the first hidden layer, a first weight associated with the second batch based on a third input activation associated with the second batch and first input gradient; and generating, by the first hidden layer, the first output activation associated with the first batch based on the first input activation, first input gradient, and first weight.

In some embodiments, the method includes generating, by the first hidden layer, the second output gradient based on the first input activation, first input gradient, and first weight.

In some embodiments, the method includes adjusting, by the first hidden layer, a learning rate based on the delay factor between the first batch and second batch; and generating, by the first hidden layer, the first weight associated with the second batch by applying the learning rate to the first input gradient associated with the second batch.

In some embodiments, the method includes receiving an original training set having a first size; and generating the first training set based on the original training set, wherein the first training set has a second size greater than the first size.

In some embodiments, the first input gradient is a first input gradient estimate received from a synthetic gradient generator.

Other aspects and features will be evident from reading the following detailed description and accompanying drawings.

BRIEF DESCRIPTION OF THE DRAWINGS

FIG. 8 is a flow diagram of a method for training a neural network system according to some embodiments of the present disclosure.

DETAILED DESCRIPTION

Figure 1:
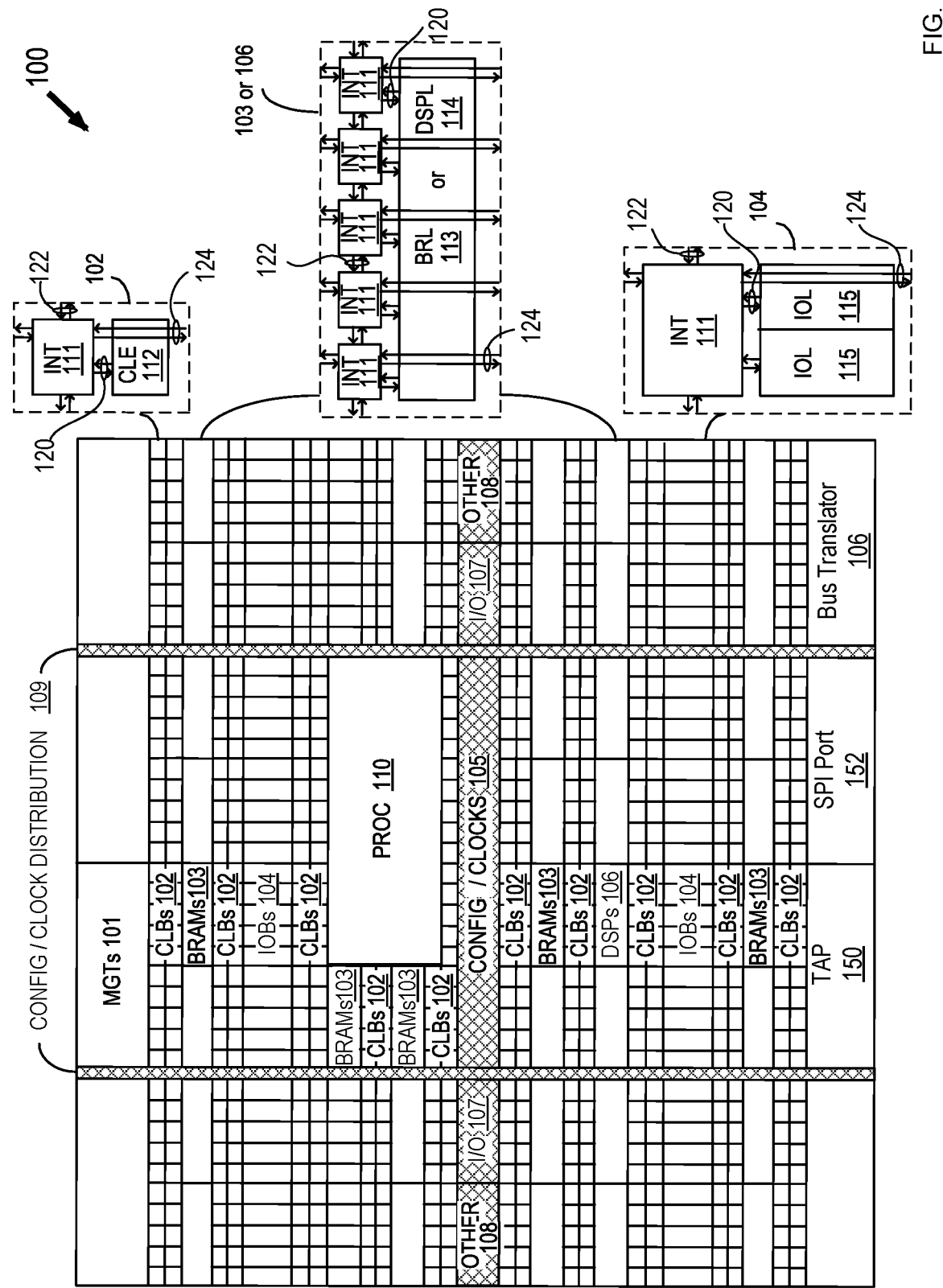
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. An artificial neural network (also referred to as neural networks below) is a model of computation inspired by the structure of brain neural networks. The neural network includes an input layer, a plurality of hidden layers, and an output layer. Each layer may include one or more basic processing elements (PEs), also referred to as neurons. These layers and their neurons are connected to each other, through which the neural network may carry out highly complex computations. An activation (e.g., an output) of a particular neuron may be obtained by applying weights to the outputs of other neurons connected to that particular neuron, generating a weighted sum of the outputs of those other neurons, and apply an activation function to the weighted sum. In some embodiments, a backpropagation learning method may be used to calculate the error contribution of each neuron after a batch of data (e.g., in image recognition, multiple images) is processed. Such error contribution may be calculated as the gradients of a loss function, where the error is calculated at the output layer and distributed back through the network layers. The weights may then by updated using the gradients.

As discussed above, a neural network typically needs to be trained on a sufficiently large training dataset. The training dataset may include a plurality of subsets (batches). A typical training algorithm may have various dependencies. Such dependencies may result in stalling and cause difficulties for implementing the neural network using multiple accelerators. Due to the dependencies present between the forward path and the backward path of the neural network, in some embodiments, the forward path for each batch is executed in a layer by layer fashion to reduce the time difference between processing adjacent batches. Furthermore, the training may be performed based on floating point arithmetic using GPGPUs. However, such training may take a long time (e.g., hours to weeks) depending on the size of the neural network and the size of the training dataset.

It has been discovered that various techniques may be used to remove the dependencies in a training algorithm, which may prevent or reduce stalling and allow implementations using multiple accelerators (e.g., multiple GPUs, multiple FPGAs, multiple application-specific integrated circuits (ASIC)s, multiple accelerators (e.g., systolic array) within a single FPGA). For example, a delayed model adaptation scheme may be used to remove dependencies between activations (e.g., computed by the forward path) and gradients (e.g., computed by the backward path) during the training. Such a delayed model adaptation allows the forward path and the backward path of neural network training to be implemented in parallel. This is achieved by introducing a delay between the output activations and the weight update and gradient calculations in each layer. This allows the calculations for each layer to be performed independently without different batches of inputs. For further example, synthetic gradients (e.g., gradient estimates generated by machine learning algorithms) may be used to provide gradients for each layer of the neural network, thereby eliminating the dependencies involving gradients during the training.

It has also been discovered that the training efficiency may be improved with little or no impact on the accuracy by removing the significant redundancy in neural networks based on floating point arithmetic. For example, data types with reduced precision (e.g., based on binary arithmetic) may be used in the training of the neural network. A neural network using binary data types (e.g., binary weights, binary activations, and/or binary gradients) may be referred to as a binarized neural network. Such a binarized neural network may be mapped efficiently to a programmable IC, such as a field programmable gate array (FPGA). Furthermore, custom data representations (e.g., representations using logarithmic arithmetic or fixed point arithmetic with or without stochastic quantization) may be used to improve the hardware implementations of the neural network.

With the above general understanding borne in mind, various embodiments for implementing a neural network are described below. Various advantages may be present in various applications of the present disclosure. No particular advantage is required for all embodiments, and different embodiments may offer different advantages. One of the advantages in some embodiments is that by removing the dependencies between layers of a neural network (e.g., by using a delayed model adaptation scheme and/or synthetic gradients), the neural network may be implemented using multiple compute units (e.g., accelerators), which may reduce the training time of the neural network. For example, the accelerators may be configured based on different computation and memory requirements of the corresponding layers, which may improve accelerator utilization.

Another advantage in some embodiments is that reduced precisions (e.g., binarized neural network) and custom data presentations (e.g., logarithmic arithmetic presentations) may be used in training the neural network, which may improve the training efficiency. Such reduced precisions and custom data presentations may be used various implementations of a neural network, e.g., implementations using a single accelerator (e.g., a single GPU, an FPGA including a single systolic array) or multiple accelerators (e.g., multiple GPUs, multiple FPGAs, a single FPGA including multiple systolic arrays).

Yet another advantage in some embodiments is that neural network training using FPGAs may use reduced power consumption (e.g., compared to GPUs), which may enable online training. Such online training may allow embedded devices of the FPGAs to continually adjust to environmental changes, and achieve accuracy and throughput tradeoffs without re-synthesis of the hardware implementation of the neural network. Yet another advantage in some embodiments is that by using a preprocessing unit (e.g., on-chip or off-chip with hardware implementation of the neural network) to artificially augment incoming training datasets (e.g., by distorting, shading, rotating, scaling), higher training accuracy may be achieved.

Yet another advantage in some embodiments is that within each layer of the neural network, random number generators may be used to support random rounding and dropout. By using the various techniques described in detail below, more efficient neural network training is achieved, thereby increasing the productivity of data scientists and improving the accuracy of neural networks.

Yet another advantage in some embodiments is that by removing the data dependency as imposed by the requirement of completing the computation of the full forward path before computing the full backward path, a higher degree of parallelism is introduced that can be exploited in accelerator architectures (e.g. dataflow).

Yet another advantage in some embodiments is that by introducing a delay in the weights in the forward paths and the updates calculated using the gradients, training can work successfully by using estimates of the gradients.

By removing the data dependency, a higher degree of parallelism is introduced that can be exploited in accelerator architectures (e.g. dataflow).

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or complex programmable logic devices (CPLDs). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the neural network is not limited to the exemplary IC depicted in FIG. 1, and that IC having other configurations, or other types of IC, may also implement the neural network system.

Figure 2:
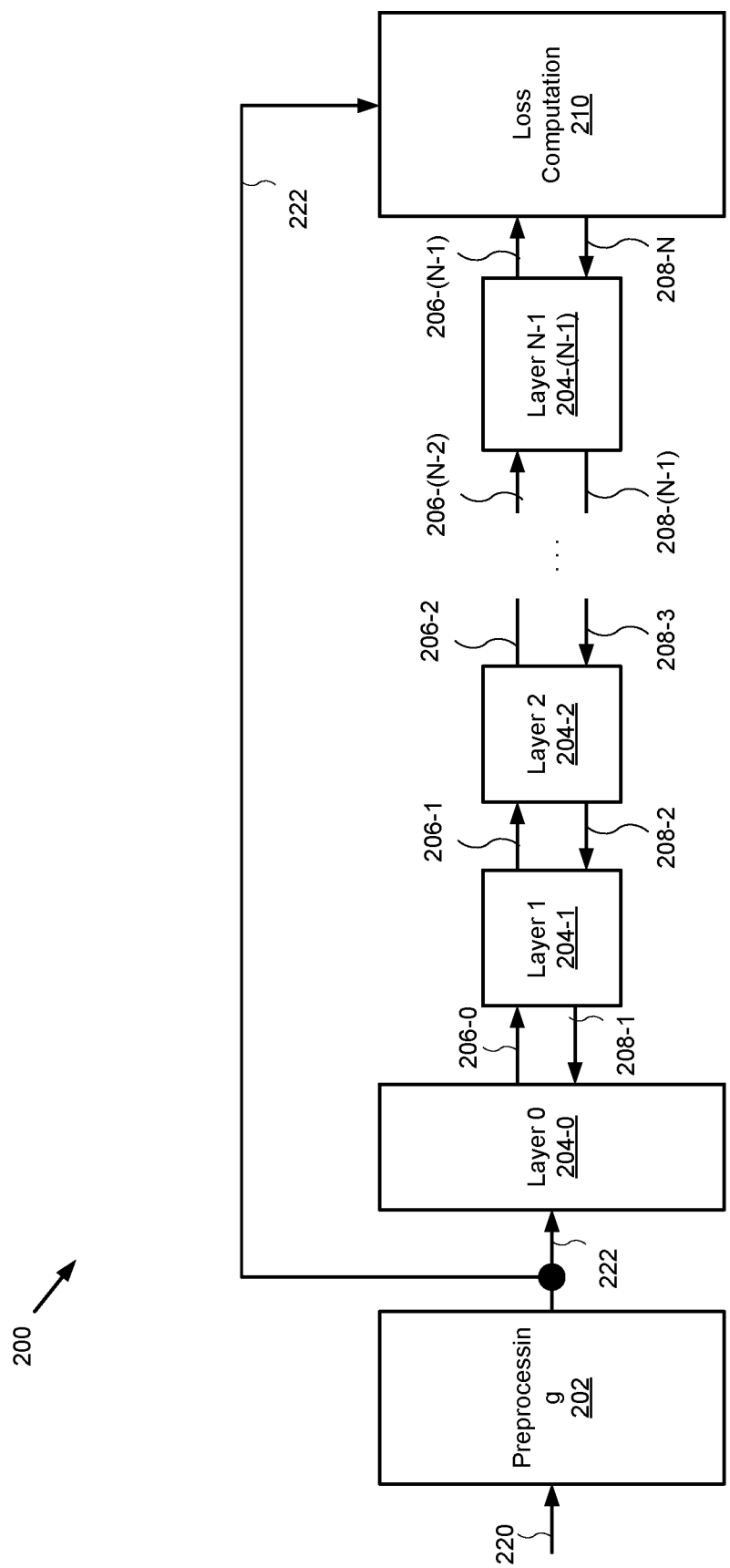
FIG. 2 is a block diagram illustrating an exemplary neural network system according to some embodiments of the present disclosure.

Referring to FIG. 2, illustrated is an exemplary neural network system 200. The neural network system 200 includes a preprocessing unit 202, N layers including layers 204-0 through 204-(N−1), and a loss computation unit 210. The layers may be implemented using programmable logic devices, DSP blocks, etc. In an example, the neural network system 200 including the N layers may be implemented in a single IC. In another example, multiple ICs may be used to implement the neural network system 200, where each IC may implement one or more layers of the neural network system 200. Each layer may include one or more neurons, each neuron having its corresponding forward path processing element (PE) and backward path PE, which will be described in detail below. The first layer 204-0 may receive the input training set, and may be referred to as the input layer 204-0. The input training set may include a sequence of batches having batch indexes 0, 1, 2, 3, . . . , B−1, where B is the number of batches in the input training set. A batch having an index b may be referred to as the $b^{th}$ batch. The last layer 204-(N−1) may provide an output for a corresponding input received by the input layer 204-0, and may be referred to as the output layer 204-(N−1). Layers 204-1 through 204-(N−2) may be referred to as hidden layers.

In some embodiments, a preprocessing unit 202 may receive an input training set 220, artificially augment batches in the input training set 220 (e.g., by performing distorting, shading, rotating, scaling, cropping, and other applicable processes), and generates the preprocessed training set 222 including augmented batches. In some examples, the augmented batch has a size that is greater or equal to that of the corresponding original batch. Such preprocessing may be performed when the data rate of input training set 220 (e.g., images) is unable to fully utilize the computational capabilities of target device(s) implementing the neural network system 200. The data rate of the input training set 220 may be affected by various processes for capturing and providing the input training set 220. For example, it may be affected by the speed of a source capture device (e.g., a camera, a microphone) for capturing the input training set 220 (e.g., images). For further example, it may be affected by a bottleneck caused by an external memory used to provide input training set 220. The preprocessing may be performed when such a data rate of the input training set 220 is lower than a threshold data rate determined based on the computational capabilities of the target device(s). In some examples, after the preprocessing, the preprocessed training set 222 has a larger size than the input training set 220. Such a preprocessed training set 222 with an increased size may improve the quality of the trained neural network (e.g., by improving the generality of models created by the neural network training), and better utilize the computational capabilities of the target device(s) implementing the neural network system.

The neural network system 200 may implement various training algorithms. In some embodiments, the neural network system may use a backpropagation algorithm. Consider a neural network has weights W(b) for the $b^{th}$ batch, and provides an estimation function $f_b(x_i)$ based on the weights W (b), where $x_i$ is an input to be estimated (i.e., an image to be recognized). For such a neural network, the backpropagation algorithm includes two processes, a forward path (forward propagation) process, and a backward path (backward propagation) process.

In some embodiments, a forward path process may include computing activations 206-0 through 206-(N−1) for all layers 204-0 through 204-(N−1). For a preprocessed training set 222 including M samples, the input/output pairs may be denoted as $\{x_i, y_i\}$ where i=0, . . . , M−1. An estimate of an output $\tilde{y}_i$ may be calculated as:

$$\tilde{y}_i = f_b(x_i),$$

where $f_b$ refers to a model described by a given neural network for weights calculated for a given $b^{th}$ batch. The process for calculating the output may include first calculating the activations 206-0 by layer 204-0, passing the activations 206-0 from layer 204-0 to the next layer 204-1, calculating the activations 206-1 by layer 204-1, and so on until the last layer 204-(N−1) calculates activations 206-(N−1). The activations 206-(N−1) may then be sent to a loss computation unit 210.

In some embodiments, the backward path process may include computing gradients 208-N through 208-1. In the example of FIG. 2, after receiving the activations 206-(N−1)

from the last layer 204-(N−1), the loss computation unit 210 may use a predetermined loss function to compute gradients 208-N based on the activations 206-(N−1) and the preprocessed training set 222. In an example, the predetermined loss function may be a sub-differential loss function, for example, a squared hinge loss function provided as:

$$l_{(y)}=\max(0,1-\tilde{y}_i y_i)^2.$$

The loss computation unit 210 may then send the gradients 208-N to the last layer 204-(N−1). A layer 204-$i$ may use the loss function to calculate its gradients 208-$i$ based on gradients 208-($i$+1) received from the next layer 204-($i$+1) and activations 206-($i$−1) received from the preceding layer 204-($i$−1). The calculated gradients 208-$i$ may then be passed to the preceding layer 204-($i$−1), which may be used to calculate the gradient at each weight by iteratively applying the chain rule, which is a formula for computing the derivative of the composition of two or more functions. Such computation of gradients continues until the gradients of weights in all layers 204-(N−1) to 204-0 have been calculated.

In some embodiments, during the backward path process, gradients of weights may be used to update the weights using a gradient descent algorithm. In an example, in a particular layer, the weight update process may be provided as follows:

$$W(b+1)=W(b)-\mu\mathrm{Grad}(b),$$

where W(b) is the weights for the $b^{th}$ batch, Grad(b) is the gradients for the $b^{th}$ batch, is a scaling factor referred to as a learning rate or a step size, and W(b+1) are the weights for the $(b+1)^{th}$ batch.

Figure 3:
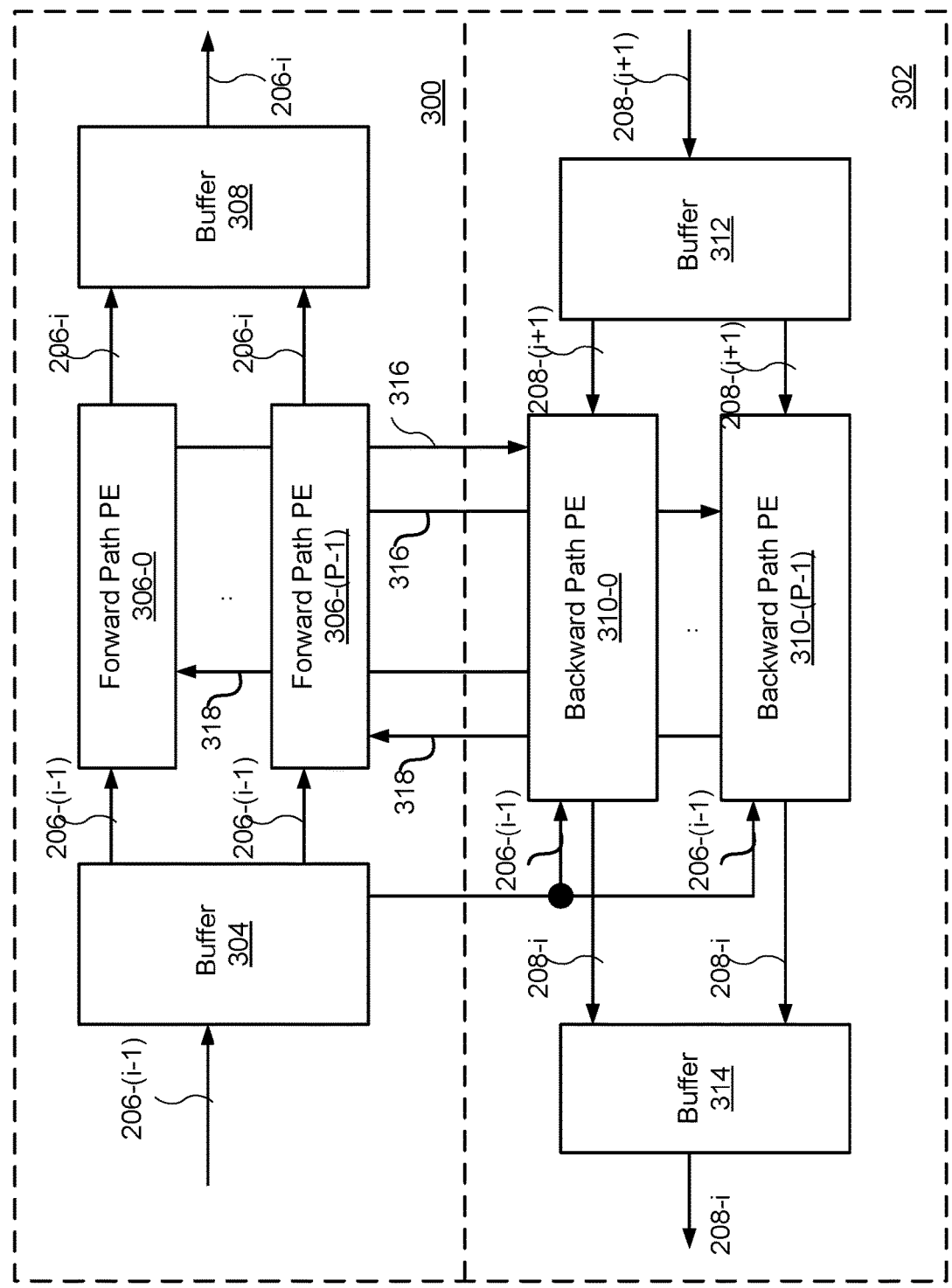
FIG. 3 is a block diagram illustrating an exemplary layer of a neural network system according to some embodiments of the present disclosure.
Figure 4:
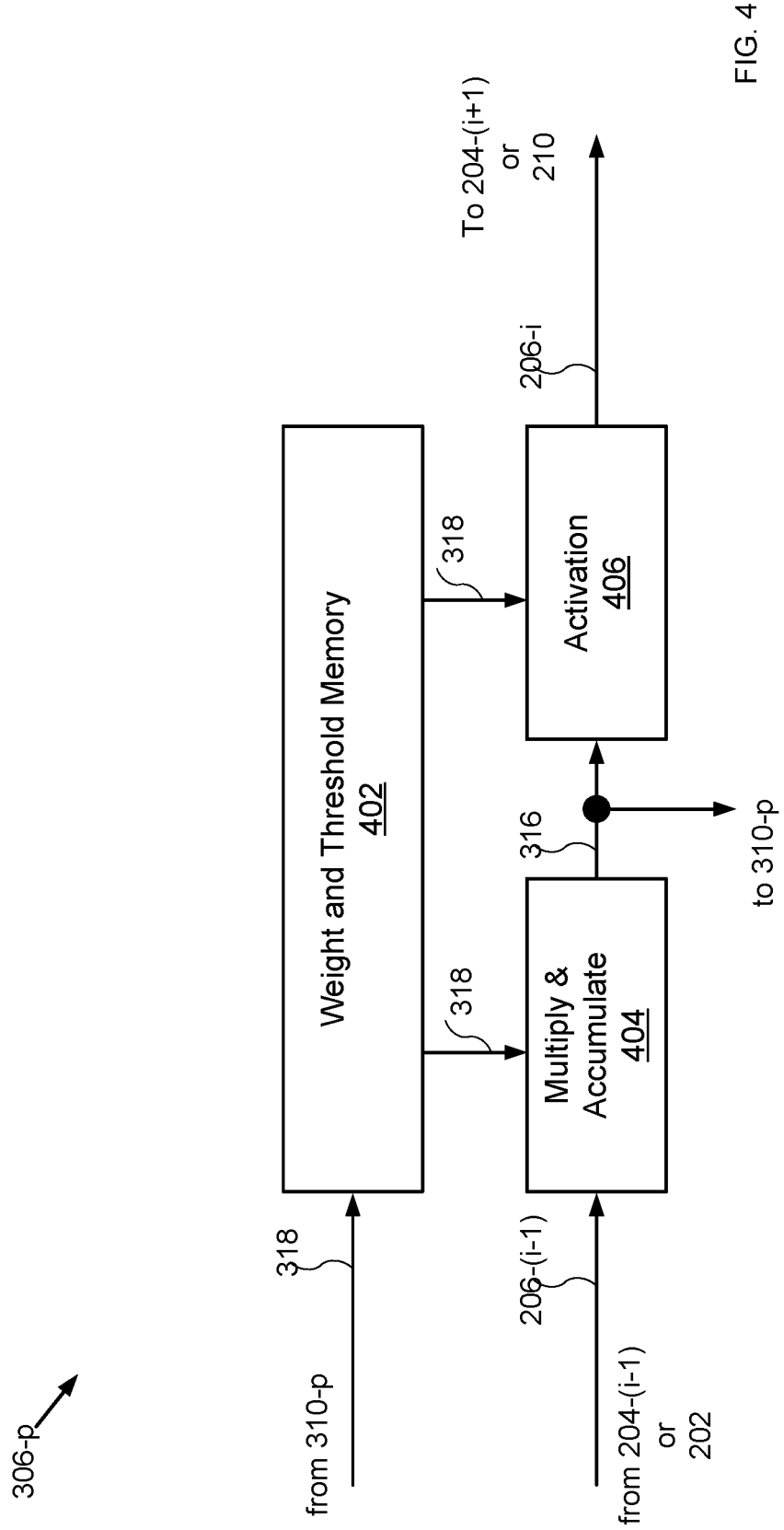
FIG. 4 is a block diagram illustrating a forward path processing element according to some embodiments of the present disclosure.
Figure 5:
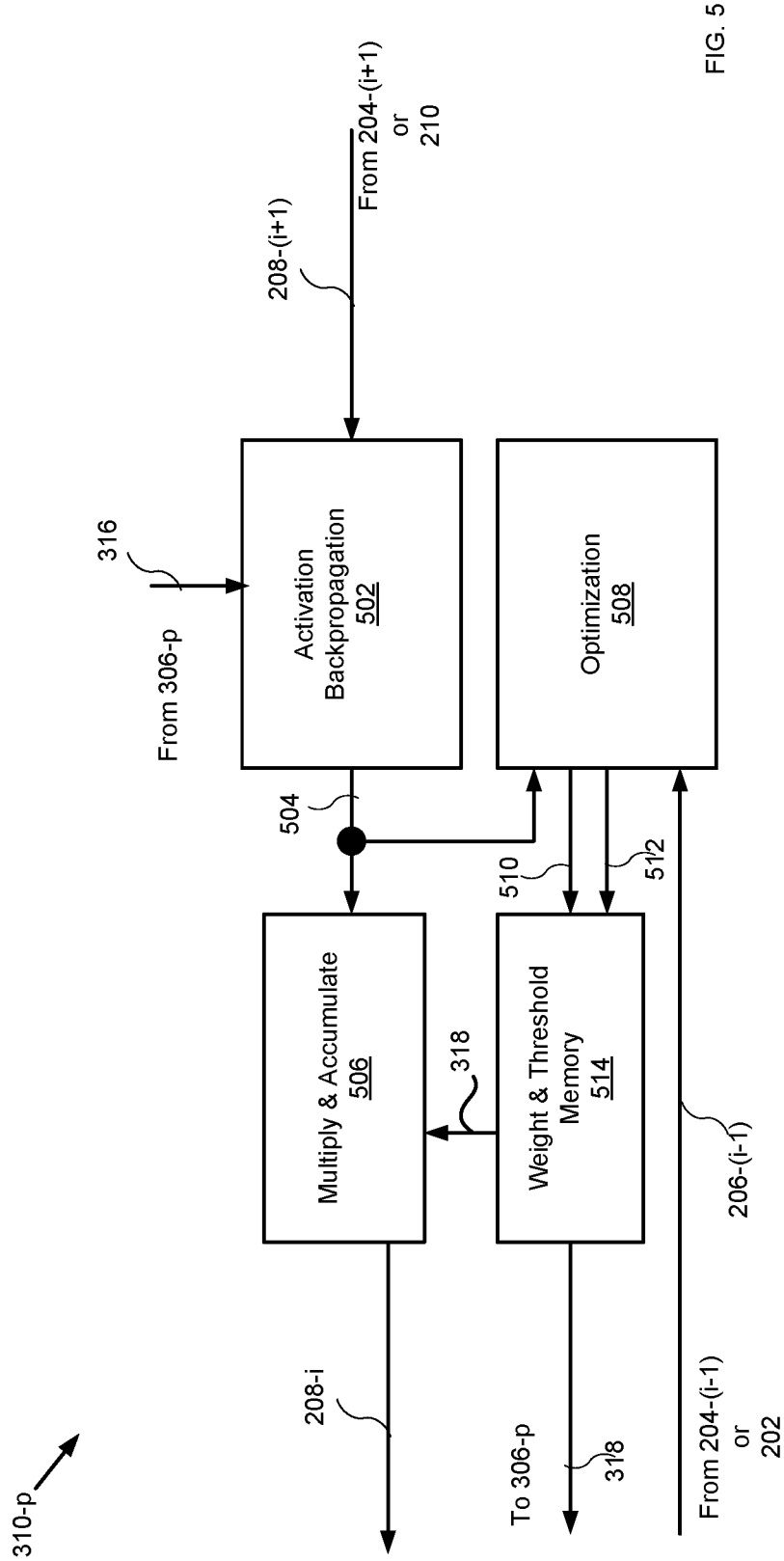
FIG. 5 is a block diagram illustrating a backward path processing element according to some embodiments of the present disclosure.

Referring to FIGS. 3, 4, and 5, an exemplary layer 204-$i$ of the neural network system 200 is illustrated. FIG. 3 illustrates a layer 204-$i$ including a forward path unit 300 for performing the forward path process of the backpropagation algorithm at the layer 204-$i$, and a backward path unit 302 for performing the backward path process of the backpropagation algorithm at the layer 204-$i$. FIG. 4 illustrates an exemplary forward path processing element (PE) of the forward path unit 300. FIG. 5 illustrates an exemplary backward path PE of the backward path unit 302.

Referring to the example of FIG. 3, a layer 204-$i$ includes a forward path unit 300 and a backward path unit 302. The forward path unit 300 includes a buffer 304 and P forward path processing elements (PEs) 306-0 through 306-(P−1), where P is an integer equal to or greater than one. The buffer 304 receives activations 206-($i$−1) from the preceding layer 204-($i$−1), and sends the activations 206-($i$−1) to P forward path PEs 306-0 through 306-(P−1). The forward path PEs 306-0 through 306-(P−1) may perform an activation generation function to generate activations 206-$i$ based on the activations 206-($i$−1) from the preceding layer 204-($i$−1), and send the activations 206-$i$ to the next layer 204-($i$+1) (e.g., through a buffer 308). In some embodiments, each forward path PE corresponds to a neuron of the layer 204-$i$. As such, the number P of forward path PEs in the forward path unit 300 may control the number of neurons of the layer 204-$i$ that may be computed in parallel in the forward path process. In some embodiments, the forward path PEs 306-0 through 306-(P−1) may receive weights 318 from corresponding backward path PEs 310-0 through 310-(P−1) respectively, and perform the activation generation function based on the updated weights 318 and the activations 206-($i$−1).

In the example of FIG. 3, the backward path unit 302 includes a buffer 312 and P backward path PEs 310-0 through 310-(P−1). The buffer 312 receives gradients 208-($i$+1) from the next layer 204-($i$+1), and sends the gradients 208-($i$+1) to P backward path PEs 310-0 through 310-(P−1). The backward path PEs 310-0 through 310-(P−1) may perform a gradient generation function to generate gradients 208-$i$ based on the activations 206-($i$−1) from the preceding layer 204-($i$−1) and the gradients 208-($i$+1) from the next layer 204-($i$+1). The gradients 208-$i$ may be sent to the preceding layer 204-($i$−1), e.g., through a buffer 314. In some embodiments, each backward path PE corresponds to a neuron of the layer 204-$i$. As such, the number P of backward path PEs in the backward path unit 302 may control the number of neurons of the layer 204-$i$ that may be computed in parallel in the backward path process. In some embodiments, the backward path PEs 310-0 through 310-(P−1) may receive activation inputs 316 from corresponding forward path PEs 306-0 through 306-(P−1) respectively, and perform the gradient generation function based on the activations 206-($i$−1) from the preceding layer 204-($i$−1), the gradients 208-($i$+1) from the next layer 204-($i$+1), and the activation inputs 316 from a corresponding forward path PE.

Referring to FIG. 4, illustrated is an exemplary forward path PE 306-$p$ of a forward path unit 300 of a layer 204-$i$. The forward path PE 306-$p$ includes a weight and threshold memory 402, a multiply and accumulate unit 404, and an activation unit 406. The weight and threshold memory 402 may receive updated weights 318 (e.g., from a corresponding backward path PE 310-$p$ of a backward path unit 302 of the layer 204-$i$), and send the weights 318 to the multiply and accumulate unit 404. The multiply and accumulate unit 404 may receive activations 206-($i$−1) from a preceding layer 204-($i$−1), receive the weights 318 from the weight and threshold memory 402, and generates activations input 316 by performing a multiply and accumulate operation (e.g., by using a hardware multiplier-accumulator (MAC) unit). The activation unit input 316 may be sent to the activation unit 406, which generates activations 206-$i$ based on the activation unit input 316 and the weights 318. The activations 206-$i$ may then be provided to an input of the next layer 204-($i$+1). In some embodiments, the activations input 316 may also be sent to the corresponding backward path PE 310-$p$ for computing gradients in the backward path process.

In the example of FIG. 4, the multiply and accumulate unit 404 may be scaled to compute S multiply accumulates per clock cycle for a single dot product. In the forward path unit 300 of FIG. 3, the number P of forward path PEs controls the number of dot products computed in parallel. As a result, a single layer 204-$i$ may computes S synapses of P neurons each clock cycle in the forward path process.

Referring to FIG. 5, illustrated is an exemplary backward path PE 310-$p$ of a backward path unit 302 of a layer 204-$i$. The backward path PE 310-$p$ includes an activation backpropagation unit 502. The activation backpropagation unit 502 receives gradients 208-($i$+1) (e.g., from the next layer 204-($i$+1) or the loss computation unit 210) and activations input 316 from a corresponding forward path PE 306-$p$, and generates gradients 504 based on an activation gradient function. The multiply and accumulate unit 506 may generate gradients 208-$i$ based on weights 318 (e.g. received from the weight and threshold memory 514) and the gradients 504. The gradients 208-$i$ may then be provided to a preceding layer 204-($i$−1).

In the example of FIG. 5, the multiply and accumulate unit 506 may be scaled to compute S multiply accumulates per clock cycle for a single dot product. In the backward path unit 302 of FIG. 3, the number P of backward path PEs controls the number of dot products computed in parallel. As a result, a single layer 204-$i$ may computes S synapses of P neurons each clock cycle in the backward path process.

In the example of FIG. 5, the gradients 504 may also be sent to an optimization unit 508. The optimization unit 508 may update weights and thresholds based on the gradients 504 and the activations 206-($i$−1) (e.g., from the preceding layer 204-($i$−1) or the preprocessing unit 202, and send the updated weights 510 and thresholds 512 to a weight and threshold memory 514. The optimization unit 508 may use optimization algorithms including, for example, stochastic gradient descent, batch gradient descent, gradient descent, Adam, and/or any other applicable optimization algorithms. In some embodiments, the weight and threshold memory 514 may send the weights and thresholds 318 to a corresponding forward path PE 306-$p$.

In some embodiments, the training algorithm (e.g., a backpropagation algorithm) used for training of the neural network 200 may have various dependencies. Such dependencies may result in stalling and cause difficulties for implementing the neural network using multiple accelerators. For example, in a backpropagation algorithm, during the forward path process, a particular layer 204-$i$ may require that its weights for the batch b, denoted as $W_i(b)$, have been calculated in the backward path process before its forward path unit 300 computes activations for the batch b, denoted as $Act_i(b)$. Such a dependency between the forward path and backward path may prevent using multiple compute units (e.g., accelerators) for different layers 204-0 through 204-(N−1). For example, because of the dependency, when multiple compute units are used to implement different groups of layers, those compute units may be constantly waiting for either new activation inputs in the forward path process or new gradient inputs for the backward path process.

In some embodiments, to address the dependency of the backpropagation algorithm, a single compute unit (e.g., a single GPU or a single systolic array) may be used to implement the neural network training. In such embodiments, the single computing unit computes the forward path process layer by layer (e.g., from layer 204-0 through layer 204-(N−1)), and then computes the backward path layer by layer (e.g., from layer 204-(N−1) through layer 204-0) in a reverse order. However, in some embodiments, layers (e.g., layers in Convolutional Neural Networks (CNNs)) may have significantly different computation and memory requirements. As such, a "one-size-fits-all" solution that uses a single accelerator to implement all the layers often results in under-utilization of that accelerator when processing particular layers.

Figure 6:
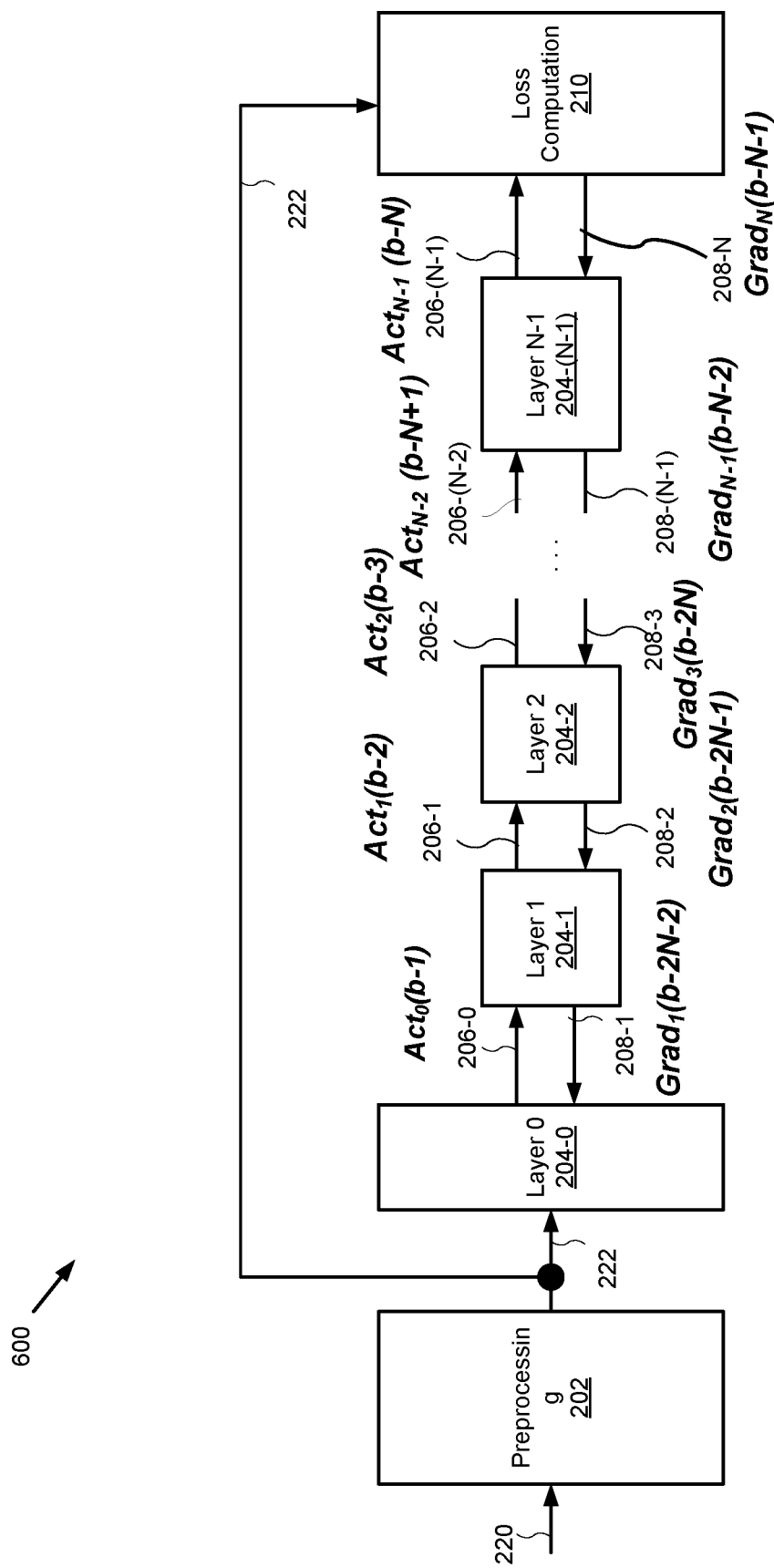
FIG. 6 is a block diagram illustrating a neural network system implementing a delayed model adaptation scheme according to some embodiments of the present disclosure.
Figure 9A:
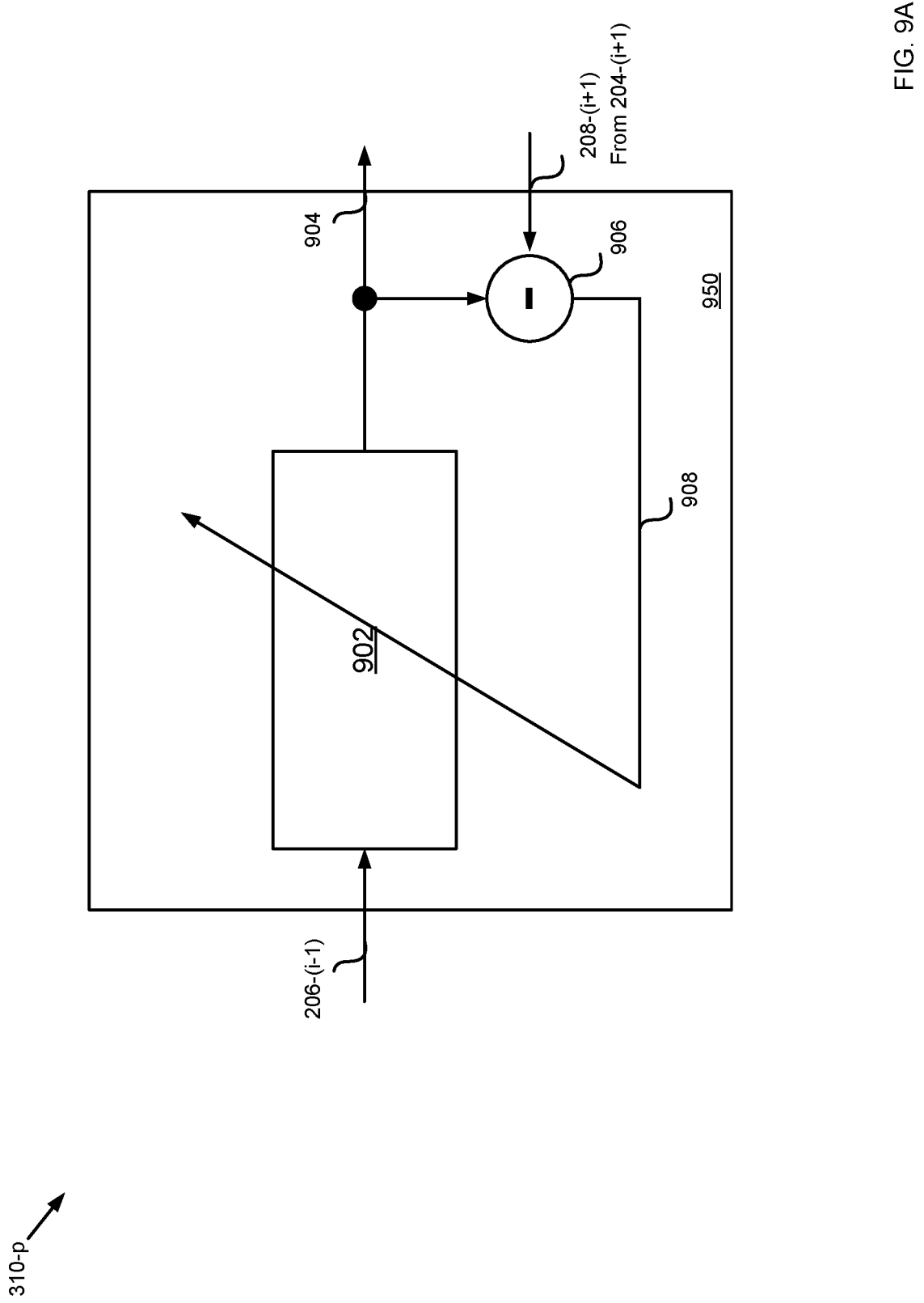
FIG. 9A is a block diagram illustrating a synthetic gradient generator according to some embodiments of the present disclosure.
Figure 9B:
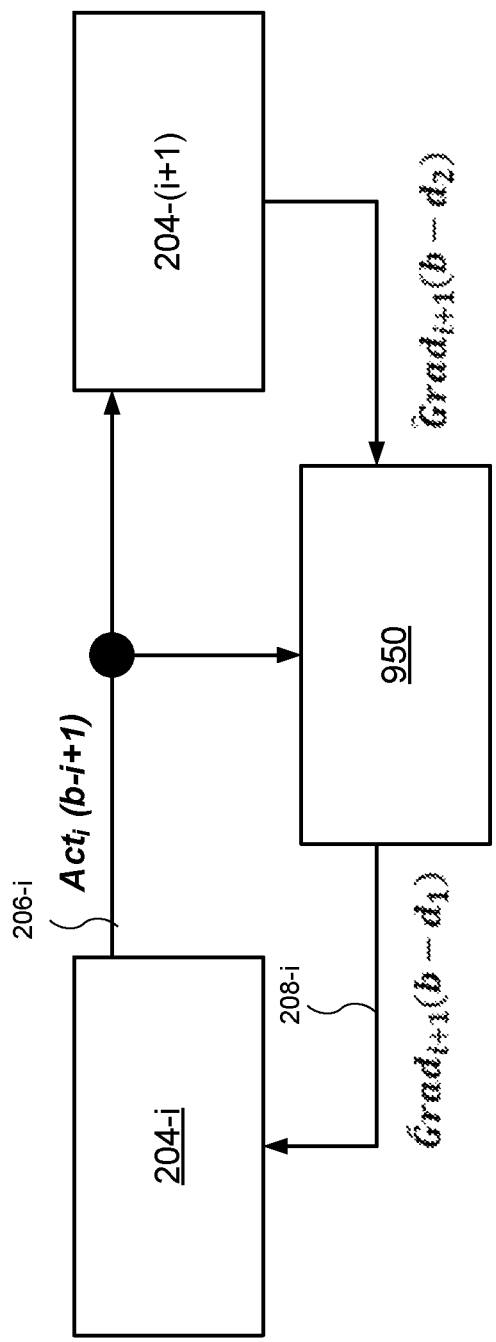
FIG. 9B is a block diagram illustrating a synthetic gradient generator according to some embodiments of the present disclosure.

Referring to FIGS. 6, 7, 8, 9A, 9B, and 10, the neural network system 200 may use various techniques to remove the dependency in the backpropagation algorithm. For example, FIG. 6 illustrates a delayed model adaptation scheme that may be used to remove the dependencies between layers. For further example, FIGS. 9A and 9B illustrate a synthetic gradient estimator that may be used to provide gradient estimates, remove dependencies between layers, and reduce the delay factor of the layers. In some embodiments, by removing the dependencies between the layers, the neural network may be implemented using multiple compute units (e.g., accelerators) assigned to process different layers. Such embodiments may reduce the training time of the neural network, and improve accelerator utilization by configuring accelerators based on different computation and memory requirements of the corresponding layers.

Referring to FIG. 6, in some embodiments, a neural network system 600 may use a delayed model adaptation scheme to remove the dependencies between the layers, thereby enabling the efficient usage of multiple accelerators (e.g., multiple GPUs, multiple FPGAs, a single FPGA including multiple systolic arrays) for implementing the neural network system 200. The neural network system 600 of FIG. 6 is substantially similar to the neural network system 200 of FIG. 2 except the differences described below. By using the delayed model adaptation, in a layer 204-$i$, activation outputs 206-$i$, denoted as $Act_i(b)$ for a batch having an index b (also referred to as the $b^{th}$ batch) of the preprocessed training set 222, may be computed using gradients 208-($i$+1) for the (b−d)$^{th}$ batch, denoted as $Grad_{i+1}(b-d)$. For example, activation outputs 206-$i$ $Act_i(b)$ may be computed by using weights $W_i(b-d)$ for the (b−d)$^{th}$ batch, where weights $W_i(b-d)$ may be computed using $Grad_{i+1}(b-d)$, which may then be used to compute activation outputs 206-$i$ $Act_i(b)$. This allows d−1 periods of delay between the calculation of the activation function (e.g., performed by the activation unit 406 of a forward path PE 306-$p$ in a layer 204-$i$) and the weight update (e.g., performed by the optimization unit 508 of a backward path PE 310-$p$).

As shown in FIG. 6, in some embodiments, at a particular time t0, each layer may operate on a different batch of the preprocessed training set 222. As such, the layers may have different delay factors (latency) d. For example, at time t0, layer 204-1 receives $Act_0(b-1)$ and $Grad_2(b-2N-1)$, and performs computation to generate $Act_1(b-1)$ based on $Act_0(b-1)$ and $Grad_2(b-2N-1)$. As such, layer 204-1 has a delay factor $d_1$ of 2N. For further example, at time t0, layer 204-2 receives $Act_1(b-2)$ and $Grad_3(b-2N)$, and performs the computation to generate $Act_2(b-2)$ using $Act_1(b-2)$ and $Grad_3(b-2N)$. As such, layer 204-2 has a delay factor $d_2$ of 2N−1. In the example of FIG. 6, the delay factor increase as the layer index increases. In other words, layers near layer 0 have delay factors that are greater than the delay factors of the layers near layer N−1.

In some embodiments, each of the layers 204-0 through 204-(N−1) may adjust its learning rate μ and/or step size based on its delay factor d. Accordingly, the layers 204-0 through 204-(N−1) may have different learning rates. In an example, a layer 204-$i$ may have a learning rate lower than a layer 204-$j$ following the layer 204-$i$, where the delay factor $d_i$ of the layer 204-$i$ is greater than the delay factor $d_j$ of the layer 204-$j$. In some embodiments, extra hardware may be used to calculate correction terms that may be used to ensure the stability of the parameters learned using the delayed model adaptation and compensate for any error introduced by inclusion of the delay model adaptation.

Note that both neural network systems 200 and 600 may utilize the same types of processing engines, but as discussed above, the ways that these processing engines are scheduled to perform the forward path process and backward path process vary significantly.

Figure 7:
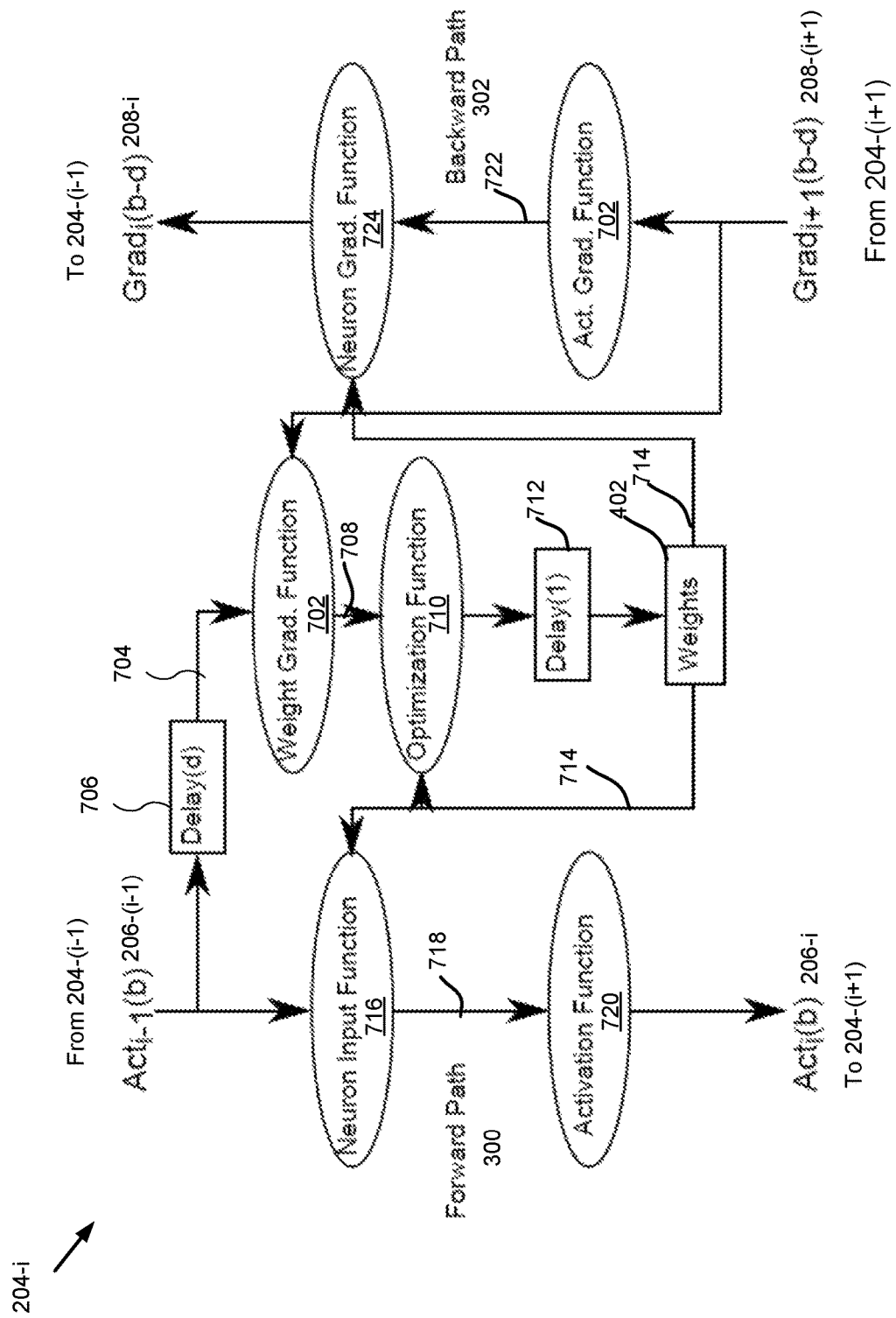
FIG. 7 is a block diagram illustrating a layer of the neural network system of FIG. 6 according to some embodiments of the present disclosure.

Referring to FIG. 7, illustrated is a portion of a layer 204-$i$ implementing delayed model adaptation. In the example of FIG. 7, at a particular time to, a weight gradient function unit 702 receives gradients 208-($i$+1) $Grad_{i+1}(b-d)$ for the (b−d)$^{th}$ batch from the next layer 204($i$+1). The weight gradient function unit 702 also receives delayed activation 704 from a delay unit 706. The delay unit 704 may generate the delayed activation 704 by applying d periods of delay (e.g., associated with d batches) to activations 206-($i$−1) $Act_{i-1}(b)$ for the $b^{th}$ batch. The weight gradient function unit 702 outputs weights 708. The weights 708 are optimized by the optimization function 710. An additional delay (e.g., one period of delay) may be applied to the resulting optimized weights by a delay unit 712 to generate weights 714 (e.g., weights 318 of FIG. 4). The weights 714 may be stored in a memory 402.

In the forward path 300, the weights 714 are used to generate activations 206-$i$ Act$_i$(b) for the b$^{th}$ batch. As illustrated in the example of FIG. 7, the weights 714 are sent to a neuron input function unit 716 (e.g. multiply and accumulate unit 404 of FIG. 4), which performs neuron input functions to activations 206-($i$–1) Act$_{i-1}$(b) using weights 714. The neuron input function unit 716 may send activation unit input 718 (e.g., activation unit input 316) to the activation unit 720 (e.g., activation unit 406 of FIG. 4). The activation unit 720 generates activations 206-$i$ Act$_i$(b) for the b$^{th}$ batch based on the activation unit input 718. The activations 206-$i$ Act$_i$(b) may then be provided to an input of the next layer 204-($i$+1).

In the backward path 302, the weights 714 are used to generate gradients 208-$i$ Grad$_i$(b–d). As illustrated in the example of FIG. 7, a weight gradient function unit 702 (e.g., activation backpropagation unit 502 of FIG. 5) receives gradients 722. The gradients 722 and weights 714 are sent to a neuron gradient function unit 724 (e.g., a multiply and accumulate unit 506 of FIG. 5). The neuron gradient function unit 724 may generate gradients 208-$i$ Grad$_i$(b–d) for the (b–d)$^{th}$ batch, and send the gradients Grad$_i$(b–d) to the previous layer 204-($i$–1).

Referring to FIG. 8, illustrated is a method 800 for implementing the delayed model adaptation for training a neural network using a backpropagation algorithm. The method begins at block 802, where a layer 204-$i$ of a neural network receives activations Act$_0$(b–d) from layer 204-($i$–1) and gradients Grad$_{i+1}$(b–d) from layer 204-($i$+1). The method 800 may proceed to block 804, where weights W$_i$(b–d) are generated based on Act$_0$(b–d) and Grad$_{i+1}$(b–d). For example, the backward path PE 310-$p$ may generate W$_i$(b–d) as described above with reference to FIG. 7. The method 800 may then proceed to block 806, where weights W$_i$(b–d) may be used to generate activations for batch t of the training set in the forward path at the layer 204-$i$. For example, weights W$_i$(b–d) may be sent to the corresponding forward path PE 306-$p$ of the layer 204-$i$. The forward path PE 306-$p$ may then use weights W$_i$(b–d) to compute Act$_i$(b) as discussed above with reference to FIGS. 3 and 4. As such, by using the delayed model adaptation, dependencies between layers for the forward path process and the backward path process are removed.

Referring to FIGS. 9A and 9B, in various embodiments, synthetic gradients may be used to remove the dependency in the backpropagation algorithm. In the example of FIG. 9A, a portion of a backward path PE 310-$p$ of a layer 204-$i$ employing synthetic gradients is illustrated. The backward path PE 310-$p$ includes a synthetic gradient estimator 950 including a synthetic gradient generator 902. The synthetic gradient generator 902 receives activations 206-($i$–1) from a preceding layer 204-($i$–1), and generates gradient estimates 904 based on the activations 206-($i$–1) and a gradient estimate error 908. The gradient estimates 904 may then be sent to the activation backpropagation units 502 of the backward path PE 310-$p$. Weights 318 may be computed based on the gradient estimates 904, and be sent to the corresponding forward path PE 306-$p$ for generating activations. As such, by using synthetic gradients, dependencies between layers for the forward path process and the backward path process are removed.

In the example of FIG. 9A, the gradient estimates 904 may be sent to a gradient estimate error generator 906 (e.g., a subtractor). After the actual gradients 208-($i$+1) becomes available (e.g., from a layer 204-($i$+1)), the gradient estimate error generator 906 may compare the gradient estimate 904 and actual gradients 208-($i$+1) to generate a gradient estimate error 908. The synthetic gradient generator 902 may improve future gradient estimates 904 based on the gradient estimate error 908. For example, the gradient estimate error 908 may be used to generate a training example for the synthetic gradient generator 902 to perform machine learning based on a machine learning algorithm (e.g., a neural network, least mean squares (LMS)). In a particular example, by using a simple LMS learning algorithm for machine learning, the hardware costs of the synthetic gradient generator 902 may be reduced. In some examples, the synthetic gradients may provide gradient estimates without actual gradients from the next layer.

Referring to FIG. 9B, in some embodiments, a synthetic gradient generator may be used together with delayed model adaptation to remove the dependency between forward and backward paths and reduce the amount of delay incurred in early hidden layers. In the example of FIG. 9B, a synthetic gradient estimator 950 may receive, from the layer 204-$i$, activations 206-$i$ Act$_i$(b–$i$+1) for the (b–$i$+1)$^{th}$ batch. The synthetic gradient estimator 950 may receive, from the following layer 204-($i$+1), gradients Grad$_{i+1}$(b–d$_2$) for the (b–d$_2$)$^{th}$ batch. The synthetic gradient estimator 950 may generate gradients $\tilde{\text{Grad}}_{i+1}$(b–d$_i$) for the (b–d$_i$)$^{th}$ batch based on the activations 206-$i$ Act$_i$(b–$i$+1) and the gradients $\tilde{\text{Grad}}_{i+1}$(b–d$_2$). In an example, d1 is less than d2. By using gradients $\tilde{\text{Grad}}_{i+1}$(b–d$_2$), the $\tilde{\text{Grad}}_{i+1}$(b–d$_1$) may be generated without waiting for the layer 204-($i$+1) to complete processing the (b–d$_1$)$^{th}$ batch, which may reduce the delay factor in the layers.

Figure 10:
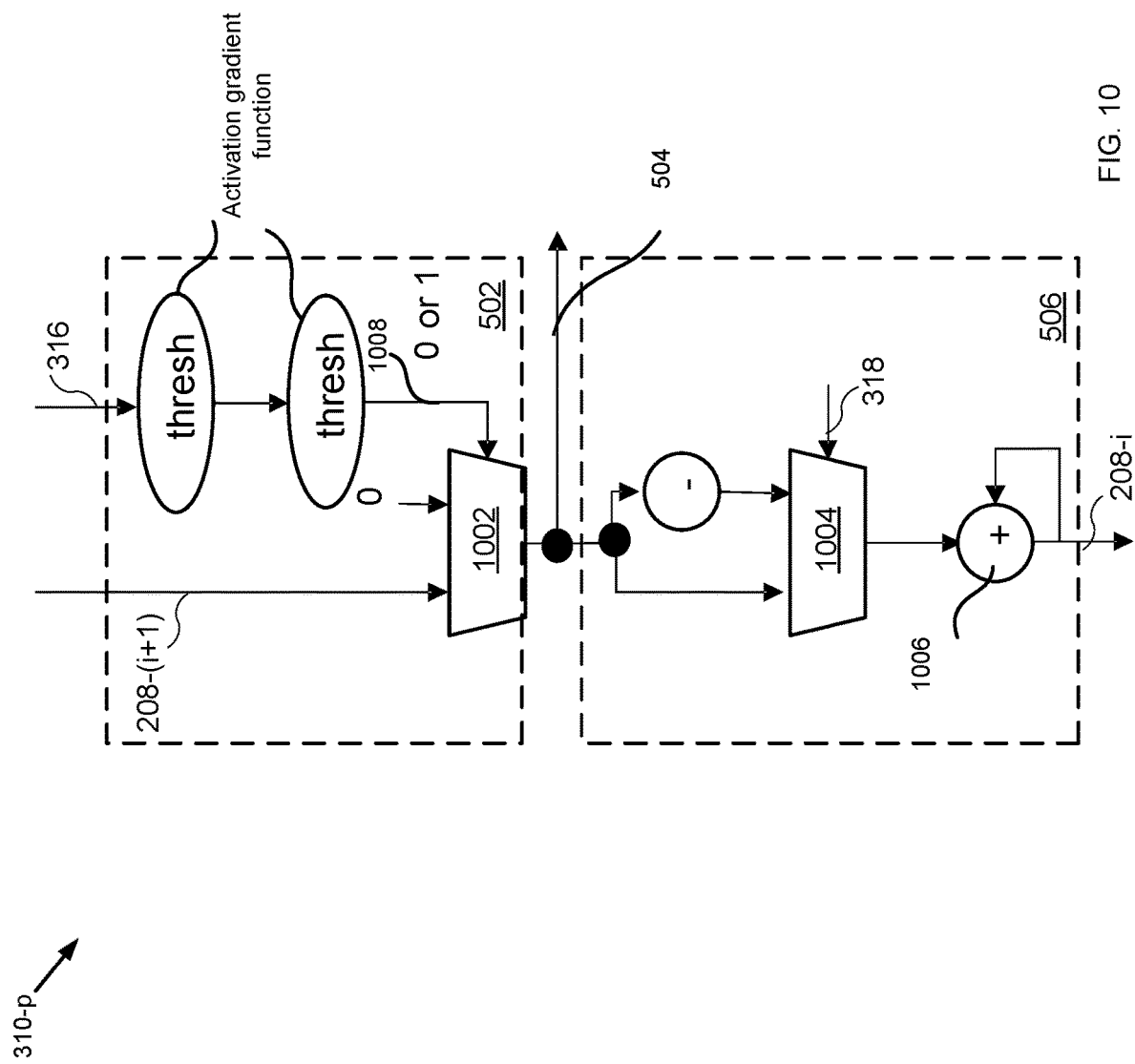
FIG. 10 is a block diagram illustrating a portion of a binarized neural network system implementing backpropagation calculation according to some embodiments of the present disclosure.

Referring to FIG. 10, in some embodiments, the performance for training the neural network systems 200 and 600 may be improved by using reduced precision networks (e.g., a binarized neural network) and custom data presentations (e.g., logarithmic data representations) to improve training efficiency. For example, when training a binarized neural network, during the forward path process, the multiplications may be performed using exclusive-NOR circuits (XNORs), and the accumulation may be performed using bit counts. For further example, logarithmic data representations may bring various benefits to hardware implementations including, for example, multiplies in the training algorithm may be implemented as additions in the hardware, and additions/subtractions in the training algorithm may be implemented using table lookups.

The example of FIG. 10 is a portion of a backward path PE 310-$p$ of a layer 204-$i$ implementing a binarized neural network. In the example of FIG. 10, during the backward path process, multiplies may only be performed between 1 s and –1 s. For fixed-point data types, multiples may be either a unity function or an element-wise bit-flip plus a 1-bit value. For logarithmic data types (including e.g., a float data type), multiples become a simple bit-flip of the sign bit. Furthermore, particular activation gradient functions (e.g. a hard tan h activation function) may be used such that the output 1008 is either 0 or 1. An XNOR circuit 1002 may receive gradients 208-($i$+1) that are binary values and the output 1008, and generates gradients 504 which may be provided to the optimization unit 508 of the backward path PE 310-$p$. In the example of FIG. 10, a multiply and accumulate unit 506 includes an XNOR circuit 1004 controlled by binary weights 318 and an adder 1006, and may generate gradients 208-$i$ that may be provided to the preceding layer 204-($i$–1). As such, by using reduced precision data type and logarithmic data presentation, the backward path PE 310-$p$ may perform the backward path process without using any multipliers.

Figure 11:
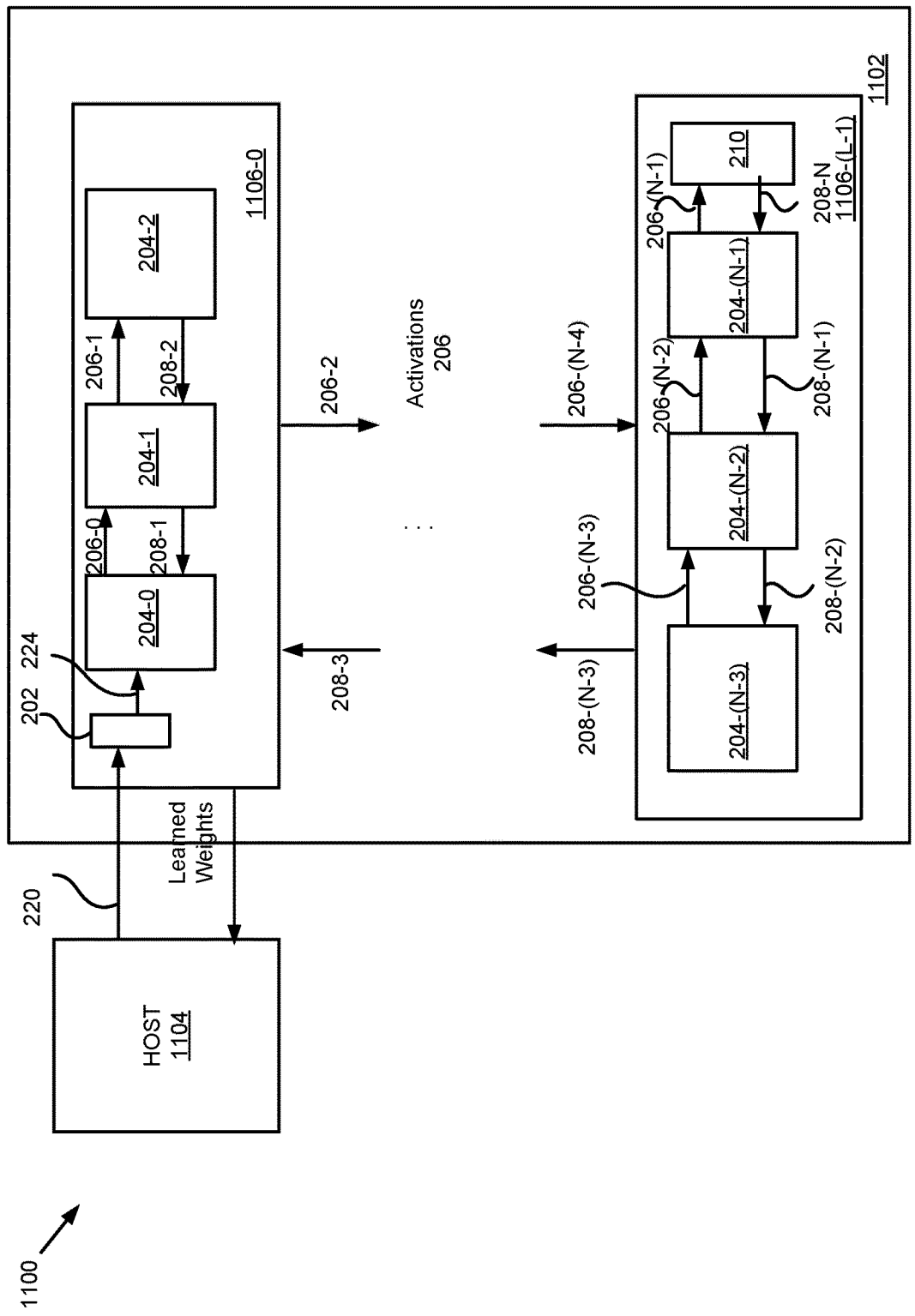
FIG. 11 is a block diagram illustrating a neural network system implemented using a plurality of computing units according to some embodiments of the present disclosure.
Figure 12:
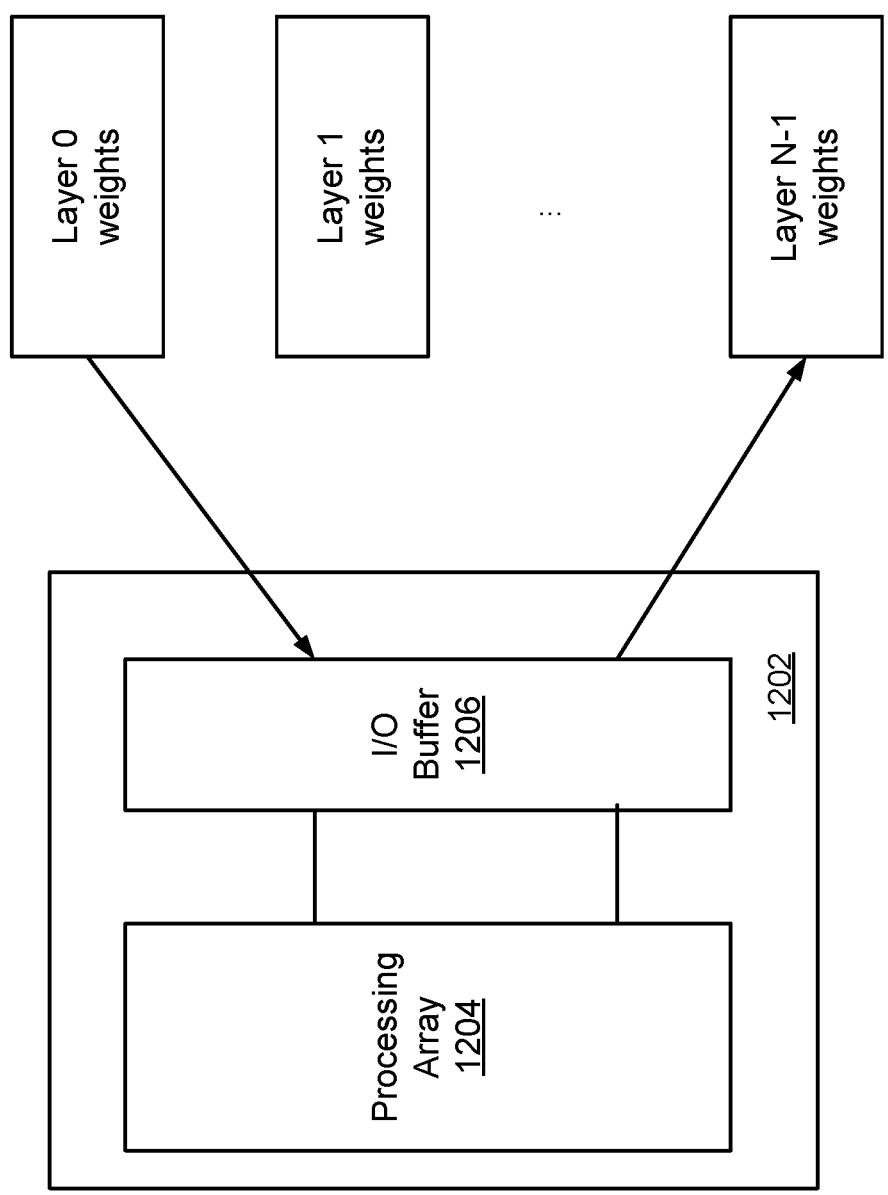
FIG. 12 is a block diagram illustrating a neural network system implemented using a single processing array according to some embodiments of the present disclosure.
Figure 13:
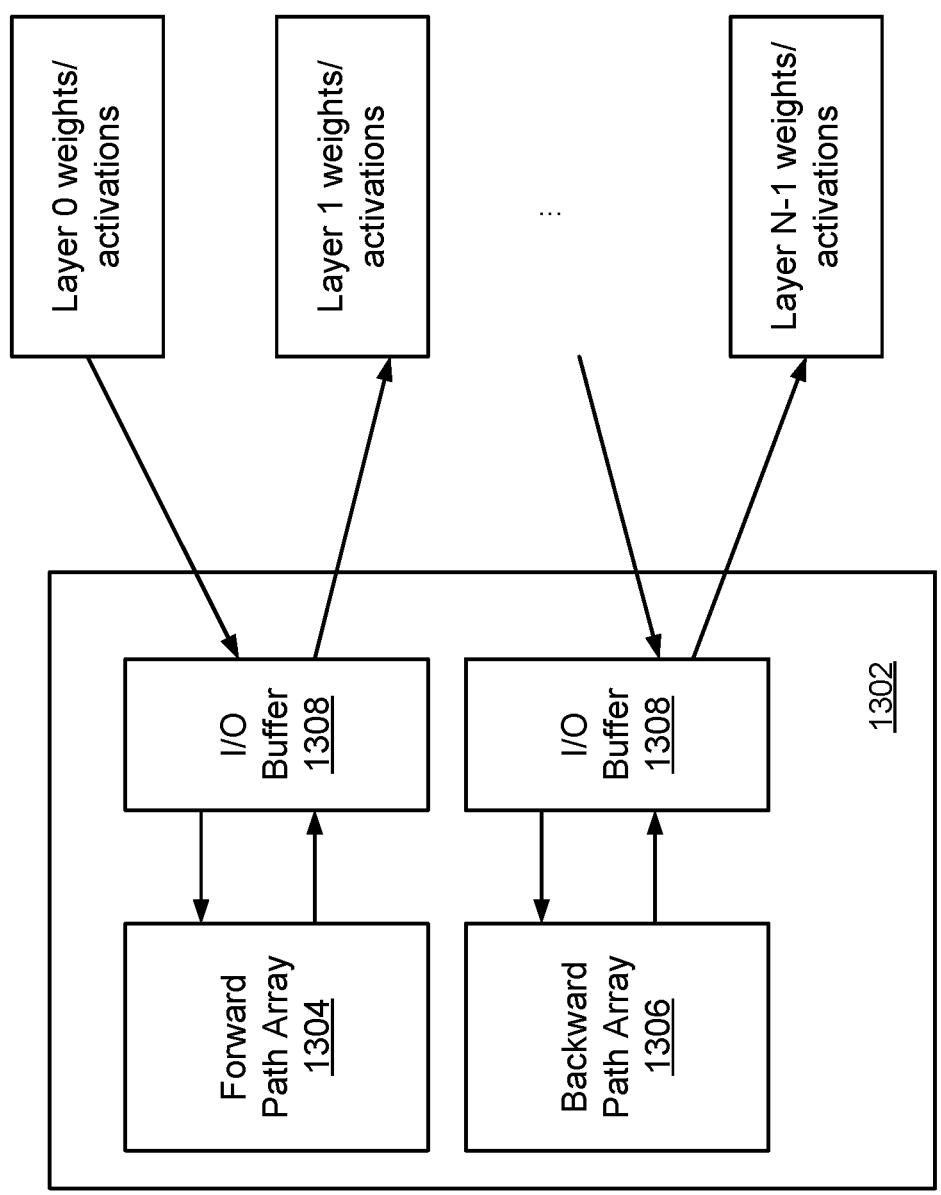
FIG. 13 is a block diagram illustrating a neural network system implemented using two processing arrays according to some embodiments of the present disclosure.

Referring to FIGS. 11, 12, and 13, various architectures may be used to implement the neural network systems 200 and 600 for scaling the neural network systems to large problems. The example of FIG. 11 illustrates a streaming architecture that uses multiple programmable ICs (e.g., multiple FPGAs) and their streaming interfaces for communication between those programmable ICs. The example of FIG. 12 illustrates an architecture using a single programmable IC (e.g., a single FPGA) including a single programmable systolic array. The example of FIG. 13 uses a single programmable IC (e.g., a single FPGA) including two systolic arrays.

Referring to FIG. 11, in some embodiments, a streaming architecture 1100 may be implemented using multiple ICs (e.g., programmable ICs each on a separate chip) using streaming interfaces between them. The streaming architecture 1100 includes a neural network system 1102 includes L ICs (e.g., FPGAs, GPUs) 1106-0 through 1106-(L−1), where L is a positive integer. Each of the IC 1106-$i$ may be used to implement one or more layers. In the example of FIG. 11, the IC 1106-0 is used to implement layers 204-0 through 204-2, and the IC 1106-(L−1) is used to implement layers 204-(N−3), 204-(N−2), and 204-(N−1). A host 1104 may send a training set 220 to the neural network system 1102, and may receive learned weights from the neural network system 1102.

Referring to FIG. 12, in some embodiments, a single IC 1202 including a single processing array 1204 and an IO buffer 1206 may be used to implement the neural network system 200. The single processing array 1204 may be a systolic array, and may be referred to as a systolic array 1204. The systolic array 1204 may be used to compute the forward path and/or backward path for fully connected layers, convolutional layers, and/or max-pooling layers of the neural network system 200. In an example, the layers 204-0 through 204-(N−1) are time-multiplexed onto the systolic array 1204. In other words, the systolic array 1204 may be configured to implement the layer 204-0, then the layer 204-1, and so on until implementing the layer 204-(N−1). The results generated by the systolic array 1204 for a layer 204-$i$ may be saved to be used as input to the next implementation of a layer (e.g., a next layer 204-($i$+1) in the forward path process, and a preceding layer 204-($i$−1) in the backward path process).

Referring to FIG. 13, in some embodiments, a single programmable IC 1302 including two systolic arrays 1304 and 1306 and I/O buffers 1308 are used. For example, the systolic array 1304 may be used to compute the forward path process for all the layers 204-0 through 204-(N−1), and is also referred to as the forward path systolic array 1304. For further example, the systolic array 1306 may be used to compute the backward path process for all the layers 204-(N−1) through 204-0, and may also be referred to as the backward path systolic array 1306. The systolic arrays 1304 and 1306 may be scheduled to minimize the adaptation delay in all layers 204-0 through 204-(N−1).

In various embodiments, to train the neural network systems 200 and 600, a user may generate descriptions for the neural network. In some examples, based on the description, custom hardware may be generated. In some examples, a bitstream for an accelerator corresponding to a predetermined architecture (e.g., the architectures of FIGS. 11, 12, and/or 13) may be loaded based on the description. The choice of whether to generate a custom architecture may be determined based on performance models generated architectures, the target device, place and route time estimates, the dataset size, the number of iterations. In some embodiments, the place and route time estimates, the dataset size, and the number of iterations may be generated offline. In some embodiments, the systolic arrays may be scheduled to minimize the adaptation delay in all layers.

It is noted that various configurations (e.g., the number N of layers, the number S of multiply accumulates computed by the multiply and accumulate unit each clock cycle, the number P of forward/backward path PEs) illustrated in FIGS. 2-13 are exemplary only and not intended to be limiting beyond what is specifically recited in the claims that follow. It will be understood by those skilled in that art that other configurations may be used. In some embodiments, a delayed model adaptation scheme of FIGS. 6 through 8 may be used together with synthetic gradients described with reference to FIG. 9. In other embodiments, the delayed model adaptation scheme may be used to replace synthetic gradients entirely to reduce the hardware cost of synthetic gradients. In some embodiments, one or more optimization techniques (e.g., reduced precision networks, logarithmic data representations, other applicable optimization techniques, or a combination thereof) may be used in the architectures of FIGS. 11, 12, and 13. Furthermore, while binary values are used as an exemplary representation, various representations including for example ternary values, fixed point, floating point, and log2 representation may be used.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A neural network system, comprising:
an input layer configured to:
    receive a first training set including a sequence of batches; and
    provide, to a following layer of the input layer, a plurality of output activations associated with the sequence of batches respectively;
one or more hidden layers following the input layer, the one or more hidden layers including a first hidden layer configured to:
    receive, from a preceding layer of the first hidden layer, a first input activation associated with a first batch;
    receive a first input gradient associated with a second batch preceding the first batch, wherein the first and second batches have a delay factor associated with at least two batches; and
    provide, to a following layer of the first hidden layer, a first output activation associated with the first batch based on the first input activation and first input gradient;
an output layer following the one or more hidden layers, wherein the output layer is configured to:
    receive, from a preceding layer of the output layer, a second input activation; and
    provide, to the preceding layer of the output layer, a first output gradient based on the second input activation and the first training set.

2. The neural network system of claim 1, wherein the first hidden layer is configured to:
provide, to the preceding layer of the first hidden layer, a second output gradient associated with the second batch based on the first input activation and the first input gradient.

3. The neural network system of claim 2, wherein the first hidden layer is configured to:
generate a first weight associated with the second batch based on a third input activation associated with the second batch and first input gradient; and
generate the first output activation associated with the first batch based on the first input activation, first input gradient, and first weight.

4. The neural network system of claim 3, wherein the first hidden layer is configured to:
generate the second output gradient based on the first input activation, first input gradient, and first weight.

5. The neural network system of claim 3, wherein the first hidden layer is configured to:
adjust a learning rate based on the delay factor between the first batch and second batch; and
generate the first weight associated with the second batch by applying the learning rate to the first input gradient associated with the second batch.

6. The neural network system of claim 1, further comprising:
a preprocessing unit configured to:
receive an original training set having a first size; and
generate the first training set based on the original training set, wherein the first training set has a second size greater than the first size.

7. The neural network system of claim 1, wherein the first hidden layer is configured to:
receive, from the following layer of the first hidden layer, the first input gradient.

8. The neural network system of claim 1, wherein the first hidden layer is coupled to a synthetic gradient generator that is configured to:
generate a first input gradient estimate using a second input gradient associated with a third batch preceding the second batch; and
provide to the first hidden layer the first input gradient estimate as the first input gradient.

9. The neural network system of claim 8, wherein the synthetic gradient generator is configured to:
receive a second input gradient from the following layer of the first hidden layer;
generate a gradient estimate error based on the first input gradient estimate and the second input gradient; and
generate a second input gradient estimate based on the gradient estimate error using a machine learning algorithm.

10. The neural network system of claim 1, wherein the first input activation, the first output activation, the second input activation, and the first output gradient include binary values.

11. The neural network system of claim 1, further comprising:
a logarithmic data representation configured to quantize the first input activation, the first output activation, the second input activation, and the first output gradient in a log-domain.

12. The neural network system of claim 1, further comprising:
a first integrated circuit (IC) configured to implement a first layer of a plurality of layers including the input layer, the one or more hidden layers, and the output layer, wherein the first IC has a first computational capacity according to a first computational capacity requirement of the first layer; and
a second IC configured to implement a second layer of the plurality of layers, wherein the second IC has a second computational capacity according to a second computational capacity requirement of the second layer.

13. The neural network system of claim 1, further comprising:
a plurality of accelerators,
wherein each accelerator is configured to implement one layer of the input layer, the one or more hidden layers, and the output layer, and
wherein each accelerator is configured to have a computational capacity and a memory capacity based on the respective layer.

14. A method, comprising:
receiving, by an input layer, a first training set including a sequence of batches;
providing, by the input layer to a following layer of the input layer, a plurality of output activations associated with the sequence of batches respectively;
receiving, by a first hidden layer from a preceding layer of the first hidden layer, a first input activation associated with a first batch;
receiving, by the first hidden layer, a first input gradient associated with a second batch preceding the first batch, wherein the first and second batches have a delay factor associated with at least two batches;
providing, by the first hidden layer to a following layer of the first hidden layer, a first output activation associated with the first batch based on the first input activation and first input gradient;
receiving, by an output layer following the first hidden layer from a preceding layer of the output layer, a second input activation; and
providing, by the output layer to the preceding layer of the output layer, a first output gradient based on the second input activation and the first training set.

15. The method of claim 14, further comprising:
providing, by the first hidden layer to the preceding layer, a second output gradient associated with the second batch based on the first input activation and the first input gradient.

16. The method of claim 15, further comprising:
generating, by the first hidden layer, a first weight associated with the second batch based on a third input activation associated with the second batch and first input gradient; and
generating, by the first hidden layer, the first output activation associated with the first batch based on the first input activation, first input gradient, and first weight.

17. The method of claim 16, further comprising:
generating, by the first hidden layer, the second output gradient based on the first input activation, first input gradient, and first weight.

18. The method of claim 16, further comprising:
adjusting, by the first hidden layer, a learning rate based on the delay factor between the first batch and second batch; and
generating, by the first hidden layer, the first weight associated with the second batch by applying the learning rate to the first input gradient associated with the second batch.

19. The method of claim 14, further comprising:
receiving an original training set having a first size; and
generating the first training set based on the original training set, wherein the first training set has a second size greater than the first size.

20. The method of claim 14, wherein the first input gradient is a first input gradient estimate received from a synthetic gradient generator.

* * * * *